April 12, 1938.　　　　　G. WALLER　　　　　2,113,608
BRAKE
Filed Nov. 25, 1935　　　2 Sheets-Sheet 1

INVENTOR
George Waller,
BY
ATTORNEYS

April 12, 1938.　　　　　G. WALLER　　　　　2,113,608
BRAKE
Filed Nov. 25, 1935　　　　2 Sheets-Sheet 2

INVENTOR
George Waller,
BY
ATTORNEYS

Patented Apr. 12, 1938

2,113,608

UNITED STATES PATENT OFFICE 2,113,608

BRAKE

George Waller, Detroit, Mich.

Application November 25, 1935, Serial No. 51,403

9 Claims. (Cl. 188—218)

This invention relates to friction brakes, and more particularly to wheel brakes for motor vehicles, an object of the invention being to provide a construction wherein the friction surface is self truing as it is worn away in use, and wherein overheating and consequent distortion of the parts at high speeds and severe application of brakes is effectually prevented.

It is also an object to provide for the ready removal and replacement of the friction lining without the necessity for demounting the wheel, and to provide a sectional mounting for such lining, whereby such sections may be removed and replaced by complete new sections. A further object is to facilitate placing and securing of the lining in place by providing an outer drum and an inner sectional drum detachably secured to said outer drum with friction or lining material secured to the inner face of the wall of each section by corrugating or otherwise forming said wall with depressions and molding or pressing the material into intimate contact with said wall; and it is also an object to provide certain other new and useful features in the construction and arrangement, and combination of parts, all as hereinafter more fully described and as shown in the accompanying drawings, wherein Figure 1 is a sectional and elevational view of the inside of a wheel illustrative of an embodiment of the present invention, the structure as shown in Fig. 1 being in section substantially upon the line 1—1 of Fig. 2;

Figure 1:
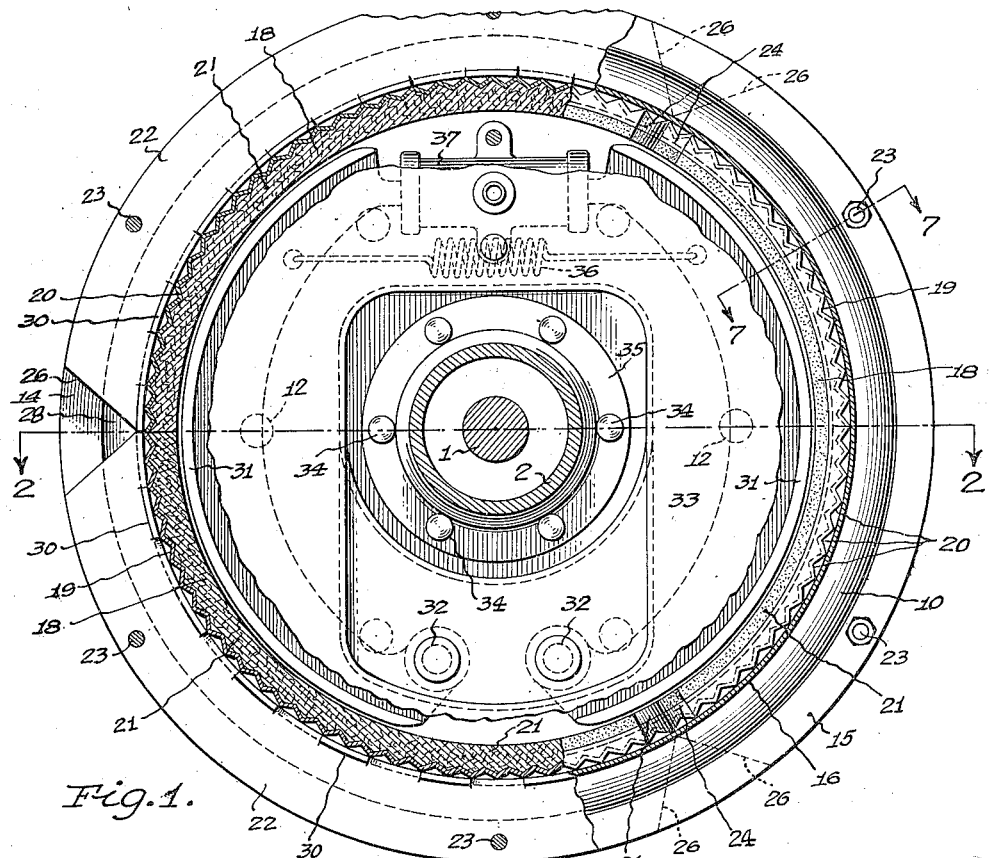
Figure 2:
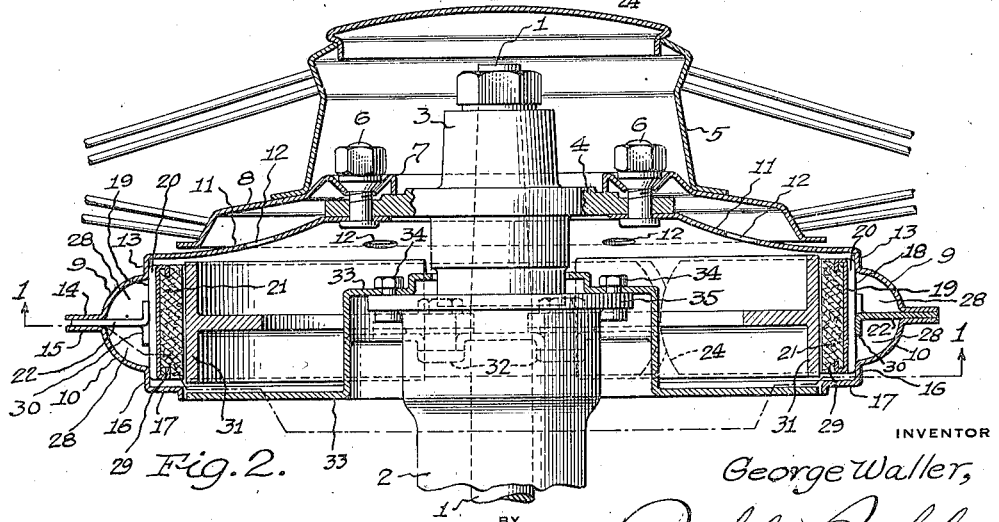
Fig. 2 is a horizontal section substantially upon the line 2—2 of Fig. 1.

In the drawings the present invention is shown as applied to a conventional form of wire wheel, hub and axle, wherein 1 indicates the live axle which projects through the fixed axle casing 2 and is secured at its outer end to a head 3 which is formed with an integral annular flange 4 to which the sheet metal hub 5 of the wheel proper, is secured by bolts 6 passing through openings in the inner formed edge 7 of a hub closure disk 8, said inner edge portion 7 of said closure disk being adapted to seat upon the driving flange 4 of the live axle and thus secure the wheel firmly to this live axle to rotate therewith.

The brake drum of the wheel comprises two parts or halves 9 and 10, the outer half 9 of the drum being formed with an inwardly extending wall 11 secured at its inner periphery to the driving flange 4 of the live axle by the same bolts 6 which attach the wheel to said flange, and this outer flange or wall 11 of the brake drum is preferably formed with a series of openings 12 inwardly from the closure disk 8 of the wheel hub, this closure disk forming a shield to prevent dirt and dust from getting into the drum through the opening 12, said openings affording an entrance into the drum for air to cool the drum. The outer half or member 9 of the drum is formed at a distance inwardly from its periphery, with a rectangular shoulder 13 and outwardly from said shoulder, the drum is curved outwardly and terminates in a peripheral outstanding flange 14. The inner member or part 10 of the outer drum is formed in a like manner with an outstanding peripheral flange 15 and is curved inwardly from said flange in a manner similar to the part 9 of the drum, said curved portion terminating in a shoulder 16 similar to the shoulder 13 and then is extended inwardly from said shoulder to provide a free edge flange 17.

Within the outer drum which is formed of the two parts 9 and 10, is an inner drum, this inner drum being formed of a plurality of separate segments or quadrants indicated as a whole by the numeral 18 and each of these drum quadrants is formed of a curved inner wall 19 which is preferably corrugated transversely to provide a plurality of transverse grooves 20 forming depressions in the inner face of this wall, these depressions may, however, be formed in any other suitable manner to receive portions of the brake lining or friction member 21 which is applied to the face of the wall 19 by molding or pressing this lining material into intimate contact with the inner face of the wall 19 while this friction lining is in a more or less plastic state so that it will flow or be pressed into the several depressions or irregular surface of said wall to firmly unite this lining to the wall and prevent the lining from moving in the direction of its length upon said wall of the segment of the drum.

Figure 3:
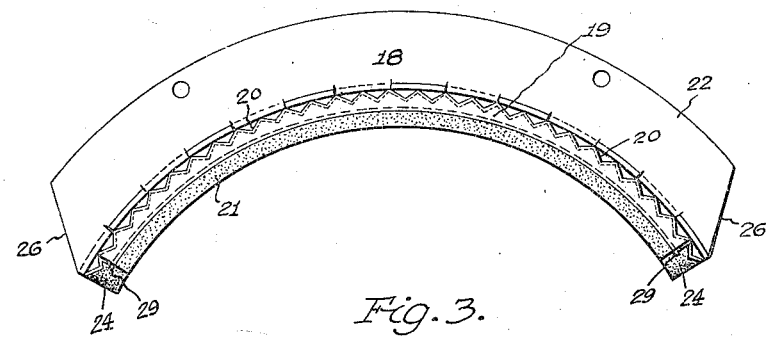
Fig. 3 is a side elevation of an inner drum section detached.
Figure 4:
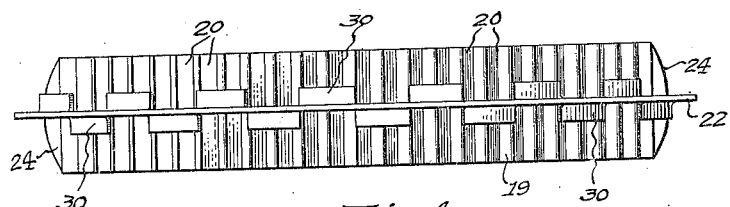
Fig. 4 is a plan view of Fig. 3.
Figure 5:
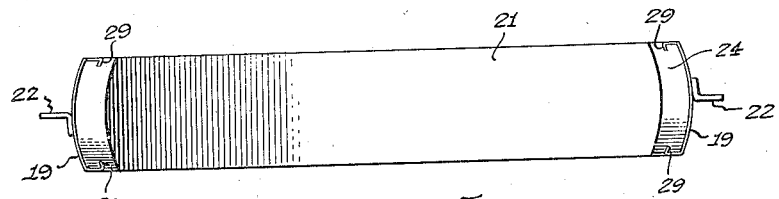
Fig. 5 is an inverted plan view of Fig. 4.
Figure 6:
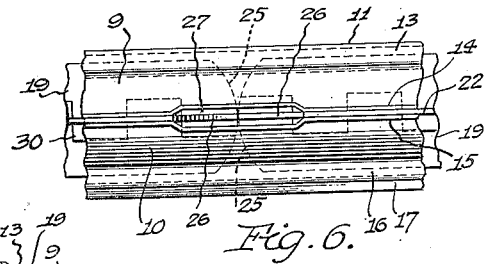
Fig. 6 is a detail showing a portion of the outer drum in elevation at the meeting ends of the inner drum sections.
Figure 7:
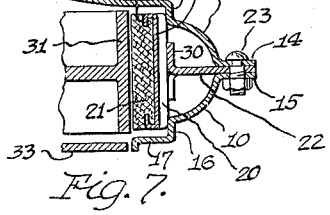
Fig. 7 is a sectional detail substantially upon the line 7—7 of Fig. 1.

To firmly anchor each drum segment 18 to the outer drum comprising the parts 9 and 10, an outstanding flange 22 is secured to the outer side of the wall 19 throughout the length of said wall and centrally thereof, this flange 22 extending radially outward between the flanges 14 and 15 of the outer drum, the flanges 14, 15, and 22 being firmly secured together by means of bolts 23 passing through openings in the several flanges and drawing these flanges into firm rigid contact. The several sections 18 forming the inner drum are therefore rigidly secured to the outer drum and held centrally thereof with their walls 19, adjacent the side edges thereof, in firm contact with the shoulders 13 and 16 of the outer drum and with the ends of the several sections 18 in abutting relation, the ends of each sector or section of the inner drum being curved transversely as at 24 with the friction lining 21 similarly curved so that the several sectors of the inner drum will abut each other at a central point or line only, whereby a space between these abutting ends will be provided toward each side edge of these ends as indicated in dotted lines at 25 in Fig. 6. Each end of the flange 22 of each drum segment, is bevelled as shown at 26 in Fig. 3 and as indicated in dotted lines in Fig. 1 and therefore a slot is provided outwardly from the abutting ends of the segments between the flanges 14 and 15, and to further increase this opening said flanges are offset opposite these bevelled ends 26 to provide air outlet openings 27 at the periphery of the outer drum as shown in Fig. 6, there being one of these openings 27 outwardly from the abutting ends of the inner drum segments.

By reason of the outwardly curved portions of the walls of the outer drum between the shoulders 13 and 16 and the flanges 14 and 15, annular chambers 28 are provided between the wall 19 of the inner drum segments and the outer wall of the outer drum, and because the ends of these segments do not abut throughout their width but provide the openings 25, air may pass through these openings into said chambers 28 and may also find its way from the interior of the drum into said chambers through the small openings provided by the corrugations 20 where the inner drum segments seat against the shoulders 13 and 16 of the outer drum. Therefore cooling of the friction lining and adjacent parts is provided by this flow of air outwardly as the wheel and drum are rotated.

To further insure the firm engagement of the brake lining 21 with the wall 19 of each inner drum segment, the side edges of this wall may be turned inwardly to form edge channels 29 to receive the friction lining material when it is applied to the drum sectors by molding or forcing it by pressure into these channels, and therefore the lining is not only held against movement in the direction of its length relative to the wall 19 but is also held against lateral movement relative to said wall, by these channels 29, and to firmly secure the flange 22 to each wall segment 19, this flange is formed with laterally bent portions 30 to seat upon the ribs or corrugations of the wall 19 and be spot welded or otherwise secured thereto.

The friction strip or lining 21 is therefore applied to and firmly held in place upon the inner surface of the wall 19 of the several inner drum segments, and internal brake shoes 31 of any suitable form and construction may be provided to engage this friction lining, these shoes being connected to the axle casing 2 and rigidly held against rotation so that upon the spreading apart or outward movement of these shoes they will come into frictional contact with the lining and frictionally retard the rotation of the wheel. As shown in the drawings, these shoes are pivotally attached at one end as at 32 to a closure disk or wall 33 secured by bolts 34 of a flange 35 on the end of the axle casing 2, said wall 33 being formed with a central depression to bring the wall into engagement with the outer side of the flange 35 and also to bring said wall into a position for the pivotal attachment of the shoes thereto. These shoes are normally swung inwardly upon their pivotal supports 32 by means of a coiled spring 36 indicated in dotted lines in Fig. 1 as connecting the free ends of the shoes, and between these ends is supported a cylinder 37 for the reception of a fluid to act against pistons (not shown) in said cylinder and force the shoes outwardly in opposite directions into contact with the friction surface, this means of operating the brakes being of the usual hydraulic type. The metal contact surface of each shoe thus directly contacts the lining 21 and therefore these shoes act to constantly smooth and keep the lining trued as it is worn away in use.

With the described construction, the brake drums may be made from comparatively thin sheet metal and by making the inner drum of a plurality of segments or sections, these segments may be made up as individual units ready to be inserted whenever it is necessary to replace the brake lining and this replacement is facilitated by making the outer drum in two parts, the inner part being detachable by the removal of the bolts 23, when this member of the drum may be moved inwardly of the axle and then the inner drum segments taken out, the wall 17 of this removable member 10 of the outer drum, extending inwardly to or beyond the plane of the inner surface of the lining on the segments with the peripheral edge of the closure disk 33 lying inwardly thereof so that the inner member 10 of the outer drum may be moved longitudinally of the axle over the peripheral edge of the closure disk, and therefore the entire inner drum with its friction lining may be quickly and easily detached without disturbing other parts of the brake mechanism and without dismounting the wheel. The arrangement also provides for the efficient cooling of the interior of the drums and also the friction lining which under certain circumstances would otherwise be overheated, the air being drawn in through the openings 12 passing up through the ends of the corrugations of the wall 19 of the inner drum and also through the openings 25 between the ends of the sections and outwardly into the chambers 28 from which the air is expelled through the slots 27 in the periphery of the outer drum. Effectual cooling is therefore afforded and a simple construction is provided which is strong and rigid and compact.

Obviously the present invention may be applied to other wheel structures than the one shown and the braking structure may be modified for ready attachment to other forms of wheels and hubs, and the drum structure and manner of applying the friction lining may also be changed without departing from the spirit of the invention and such changes are contemplated.

Having thus fully described my invention what I claim is:

1. An outer brake drum formed of laterally separable outer and inner parts, means for securing the outer of said parts to a wheel structure, removable means for securing the parts of said drum together and permitting their separation to permit movement of the inner part longitudinally of a fixed axle for the mounting of said wheel, an inner drum detachably attached to the outer drum and made in sections for free movement throughout the open side of the outer drum after removal of the inner part of said outer drum and a friction lining secured to the inner face of each section and removable therewith, each section being removable as a unit upon the removal of said inner part of said drum.

2. A brake drum comprising an outer drum formed of laterally opposed parts, means for securing one of the parts of said outer drum to a wheel structure, means for detachably securing the parts of the drum together, an inner drum having an annular outstanding flange detachably secured between said parts of said outer drum and forming a rigid attachment of said inner to said outer drum with said inner drum seated upon said outer drum, and a friction lining applied to the inner face of said inner drum and secured thereto.

3. A brake drum comprising an outer drum formed in two parts, means for detachably securing said parts together to permit separation of the parts of said outer drum, an inner drum formed of a plurality of segmental sections each having an outstanding flange and a segmental annular wall portion to seat upon said outer drum and providing openings therebetween, said flanges of said segmental sections being interposed between said parts of said outer drum to secure the inner drum to the outer drum, said outer drum forming an annular chamber between said drums at each side of said flanges, and a friction lining secured to the segmental walls of the inner drum sections.

4. A brake drum comprising an outer drum formed in two parts, means for securing the outer of said parts of said outer drum to a wheel structure, an inner drum comprising a plurality of segmental sections together forming an annular wall within said outer drum, means for detachably securing said segmental sections of said inner drum to said outer drum, and a friction lining secured to the inner surface of the segmental wall of each inner drum segment, said sections forming separate units, whereby they may be removed from the outer drum throughout the inner side thereof when said inner part of said outer drum is removed without removal from its axle, of the wheel to which said outer drum is secured.

5. A brake drum comprising an outer drum formed of an outer-side part and an inner-side part, means for securing said outer-side part to a wheel structure for mounting upon an axle, an inner drum formed of a plurality of segmental sections, an outstanding flange on each section to engage between the parts of the outer drum, means for detachably securing said parts of the outer drum together with said flanges of said segmental sections interposed, said segmental sections being seated adjacent their edges upon said outer drum in end abutting relation to form an annular inner drum wall and providing a chamber between said drums, and friction lining secured to said inner surface of each segment to form inner drum units removable throughout the inner end of said outer drum when the inner-side part of said outer drum is detached and moved longitudinally of the axle away from the inner side of the wheel.

6. A brake drum comprising an outer drum, means for securing said outer drum to a wheel structure, an inner drum detachably secured to said outer drum with a space between said drums forming an annular chamber, said inner drum having an annular wall provided with openings communicating with said annular chamber between said drums, said outer drum being formed with peripheral openings communicating with said annular chamber to provide for the flow of cooling air from the interior of the inner drum into said chamber and out through said peripheral openings in the outer drum, and a friction lining secured to the inner face of the annular wall of the inner drum.

7. A brake drum comprising an outer drum formed of separable parts, means for securing one of said parts to a wheel structure for rotation therewith, means for detachably securing said parts of said outer drum together at their peripheries, said parts of said outer drum being formed each with an annular shoulder inwardly from its periphery, an inner drum formed of a plurality of segmental sections together providing an annular drum wall, means for detachably securing each of said segmental sections to said outer drum with said sections seated against said shoulders of said outer drum and providing an annular chamber between said inner and outer drums, said outer drum being formed with peripheral openings communicating with said annular chamber, and a friction lining secured to the inner face of the inner drum wall sections.

8. A brake drum for application to a wheel structure mounted upon the outer end of a live axle projecting from the outer end of a fixed axle member, said brake drum comprising an outer drum formed in two parts, an outstanding flange on each part of said outer drum, an inner drum formed of a plurality of segmental sections supported within said outer drum with the ends of said segmental sections in abutting relation, an outstanding flange on each of said segmental sections interposed between the outstanding flanges on said parts of the outer drum, and means for detachably securing said flanges on said outer drum together with said flanges on said inner drum sections interposed, said outer drum parts together forming an annular air chamber between said outer and inner drums, and with the ends of said flanges on said inner drum segments cut away to provide openings at the periphery of said outer drum for the escape of air from said annular chamber, the segmental walls of said inner drum sections being corrugated transversely with the edge portions of said corrugated walls seated against the outer drum with said corrugations affording communication between said annular chamber of said outer drum and the interior of the inner drum.

9. A brake drum for application to a wheel structure mounted upon the outer end of a live axle projecting from the outer end of a fixed axle member, said brake drum comprising an outer drum formed in two parts, means for securing the drum part adjacent the inner side of the wheel, to said wheel, means for detachably securing said drum parts together to permit the inner of said parts to be detached and moved longitudinally over the fixed axle without removing the wheel, an inner drum formed of a plurality of segmental units secured to and seated upon said outer drum and released by the separation of said outer drum parts, and friction lining secured to the inner face of the wall of each segmental unit.

GEORGE WALLER.